Fig. 4.

Nov. 27, 1962 S. G. COLEMAN 3,065,584
METHOD AND APPARATUS FOR FORMING AND
PACKAGING BLANKS OF DOUGH
Filed Feb. 17, 1959 10 Sheets-Sheet 8

INVENTOR
SYDNEY G. COLEMAN

BY Cushman, Darby & Cushman
ATTORNEYS

Nov. 27, 1962 S. G. COLEMAN 3,065,584
METHOD AND APPARATUS FOR FORMING AND
PACKAGING BLANKS OF DOUGH
Filed Feb. 17, 1959 10 Sheets-Sheet 9

INVENTOR
SYDNEY G. COLEMAN
BY
Cushman, Darby & Cushman
ATTORNEYS

United States Patent Office 3,065,584
Patented Nov. 27, 1962

3,065,584
METHOD AND APPARATUS FOR FORMING AND PACKAGING BLANKS OF DOUGH
Sydney G. Coleman, Dallas, Tex., assignor, by mesne assignments, to Fant Milling Company, Sherman, Tex., a corporation of Texas
Filed Feb. 17, 1959, Ser. No. 793,813
13 Claims. (Cl. 53—122)

The present invention relates to packaging, and more specifically to a machine for automatically forming and packaging blanks of dough, particularly prepared dough of the nature used in packaged refrigerated dough biscuits.

Presently, biscuits of this type are placed into the containers by hand which entails great time and expense and does not afford uniformity in packaging. It is, therefore, an object of this invention to provide a machine that will automatically form and package dough biscuits which is economical and will insure uniformity of packaging.

Another method of packaging dough biscuits currently in use is by employing automatic machines of the nature described in U.S. Patents 2,664,833 and 2,707,922. Although these machines have somewhat overcome the problems accompanying hand packaging, they do not meet the advantages of the present invention. In each of these machines, large sheets of dough are used and after the biscuits are formed, large quantities of excess dough remain which must be collected and reworked. Continual reworking of the excess dough from these machines reduces the quality of the biscuits subsequently formed. It is, therefore, a further object of this invention to provide an automatic biscuit-forming and packaging machine having improved means for handling the dough so that no excess remains after the forming and packaging operation.

Another object of the present invention is the provision of a new and improved method for forming blanks of dough-like material from strips of material so as to minimize the handling of excess material.

A further object of the present invention is the provision of a machine of the type described having improved means for forming circular blanks of dough-like material from a pre-shaped strip of material in such a manner that after the final forming operation there will be no waste material.

A still further object of the present invention is the provision of a new and improved plunger and die assembly for forming blanks of dough.

Still another object of the present invention is the provision of a novel method of forming blanks of dough in which a preformed blank of dough is forced through a die of varying size and shape to conform the blank to the varying die shape so that the dough blank is re-shaped into a desired different configuration.

These and other objects of the present invention will become more apparent during the course of the following detailed description and appended claims.

The invention may best be understood with reference to the accompanying drawings wherein an illustrative embodiment is shown.

In the drawings:

FIGURE 18 is a cross-sectional view taken along the line 18—18 of FIGURE 15;

Figure 1:
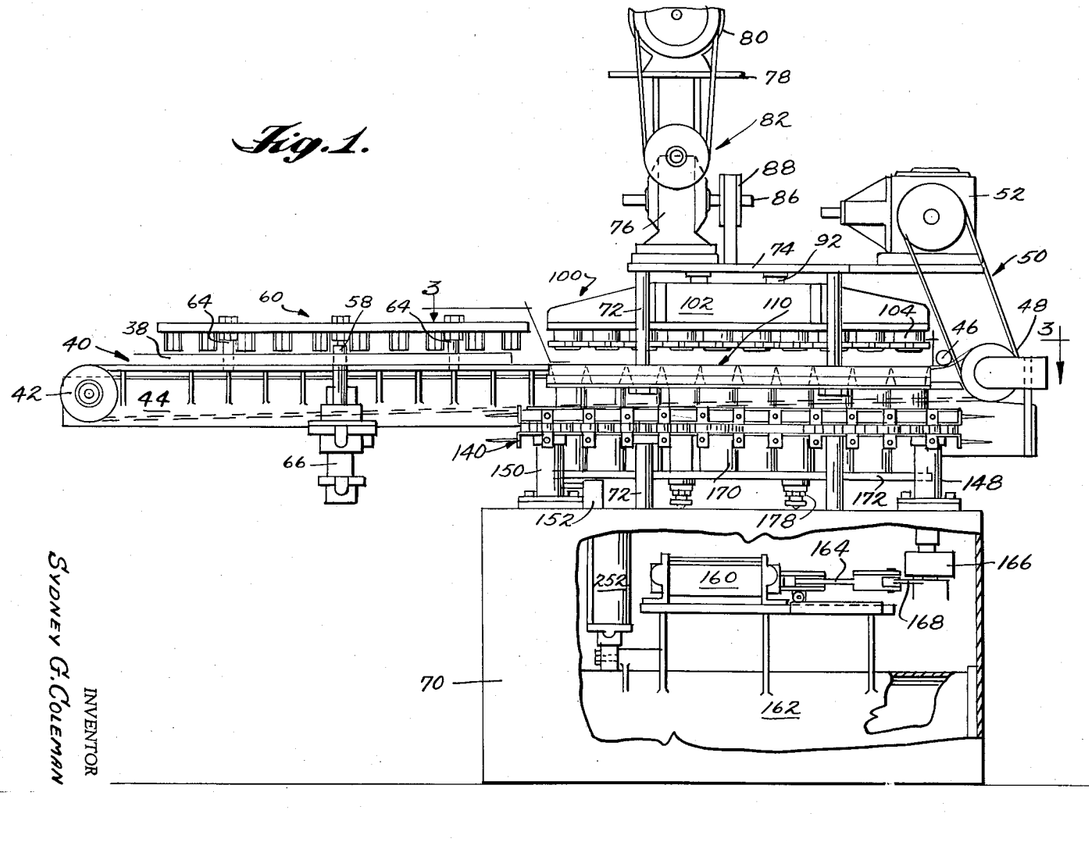
FIGURE 1 is a side elevation view of a machine embodying the principles of the present invention.

Referring now more particularly to the drawings, there is shown in FIGURE 1 a machine embodying the principles of the present invention which, in general, includes conveying means 40 for carrying ribbons of dough 38 from a dough ribbon forming station (not shown) to a dough strip notching assembly 60 where the dough ribbon is subjected to a preforming operation which includes severing to form strips of integrally joined blanks. The preformed dough strips are then conveyed by conveying means 40 to a position adjacent a die plate assembly 110 located laterally from and parallel to the conveying means. The dough strips are then moved laterally, as by a dough strip transfer mechanism 222, onto the die plate assembly where a co-operating reciprocating plunger assembly 100 is operable to form the preformed integrally joined blanks into a series of individual blanks. The series of individual dough blanks thus formed fall by gravity into a series of longitudinally spaced containers 170 supported beneath the die plate assembly by a container conveying assembly 140. The assembly 140 is intermittently driven so that after each operation of the plunger assembly, the containers are indexed forward so that a full container of blanks is removed from beneath one end of the die plate assembly and an empty container is inserted beneath the other end of the die plate assembly. The cycle of operation of the machine is such that the empty container receives one blank after each operation of the plunger assembly until it is moved from beneath the opposite end of the die plate assembly.

Figure 2:
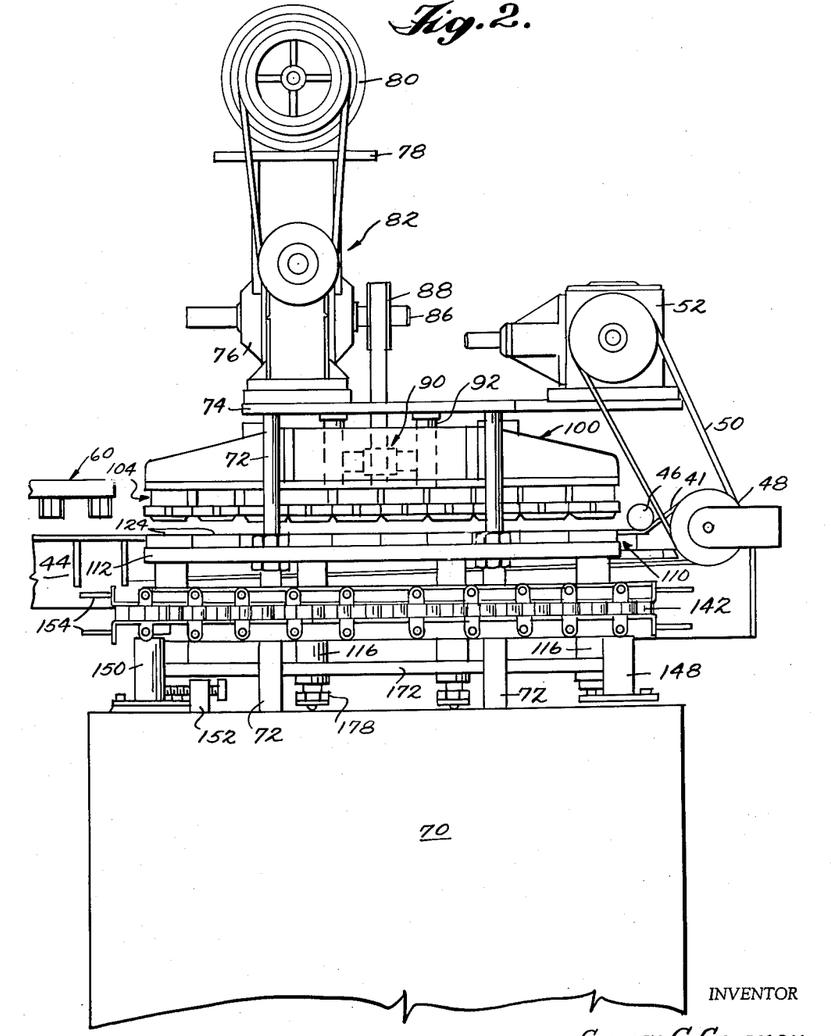
FIGURE 2 is a fragmentary side elevation view of the machine showing the blank forming and packaging station thereof.
Figure 3:
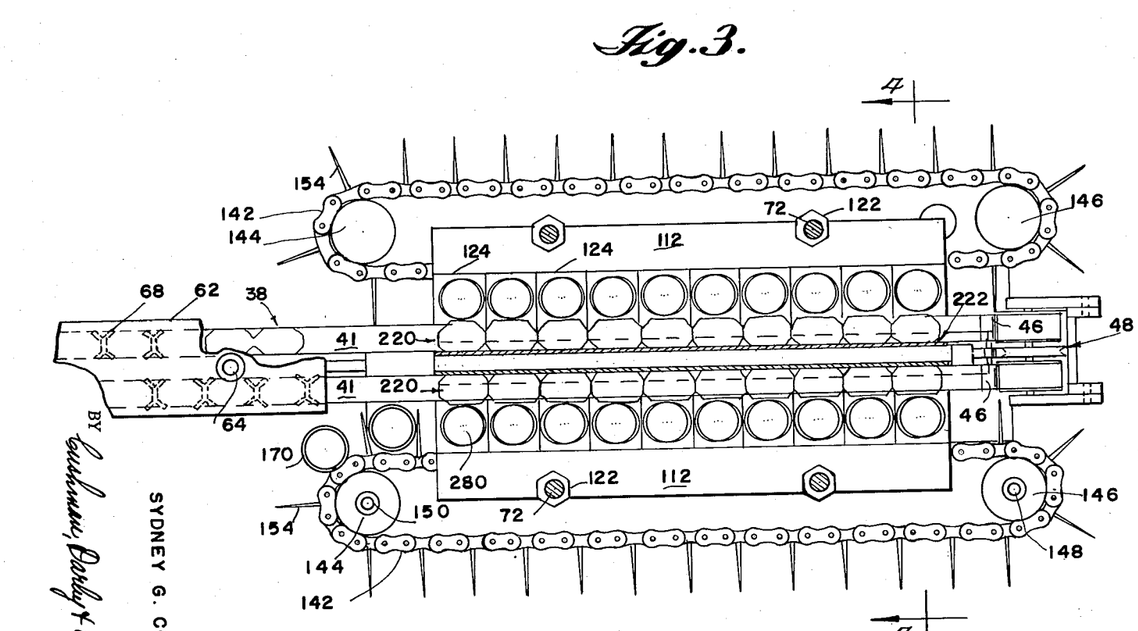
FIGURE 3 is a top plan view of the machine taken along the line 3—3 of FIGURE 1.

As best shown in FIGURES 1–3, the conveying means 40 includes a pair of parallel endless belts 41 each mounted for movement in a horizontally elongated path by any suitable means such as an idler wheel 42 journalled at one of an elongated horizontally disposed support table 44 suitably mounted on a main frame or base cabinet 70 of the machine. The upper flight of each belt rides on the upper surface of the support 44 and at the end thereof opposite from the wheel 42 passes under a guide roll 46, and then around a drive wheel 48. Any suitable means may be provided for driving the belts and, as shown, a belt and pulley assembly 50 is drivingly connected between the drive wheels and a motor 52.

As best shown in FIGURE 1 the dough strip notching assembly indicated generally as 60 is disposed at the ingress end of the conveyor belts 41 and comprises a cutter carrier 62 reciprocably supported by vertical guide supports 64 secured to the support table 44. Any suitable means may be provided for effecting the vertical reciprocation of the cutter carrier and as shown, such means includes an air cylinder 66 mounted on the support table 44 and having an actuator rod 58 extending upwardly therefrom and connected with the carrier. The carrier 62 has a plurality of dough strip notching cutters 68 extending downwardly therefrom.

Figure 4:
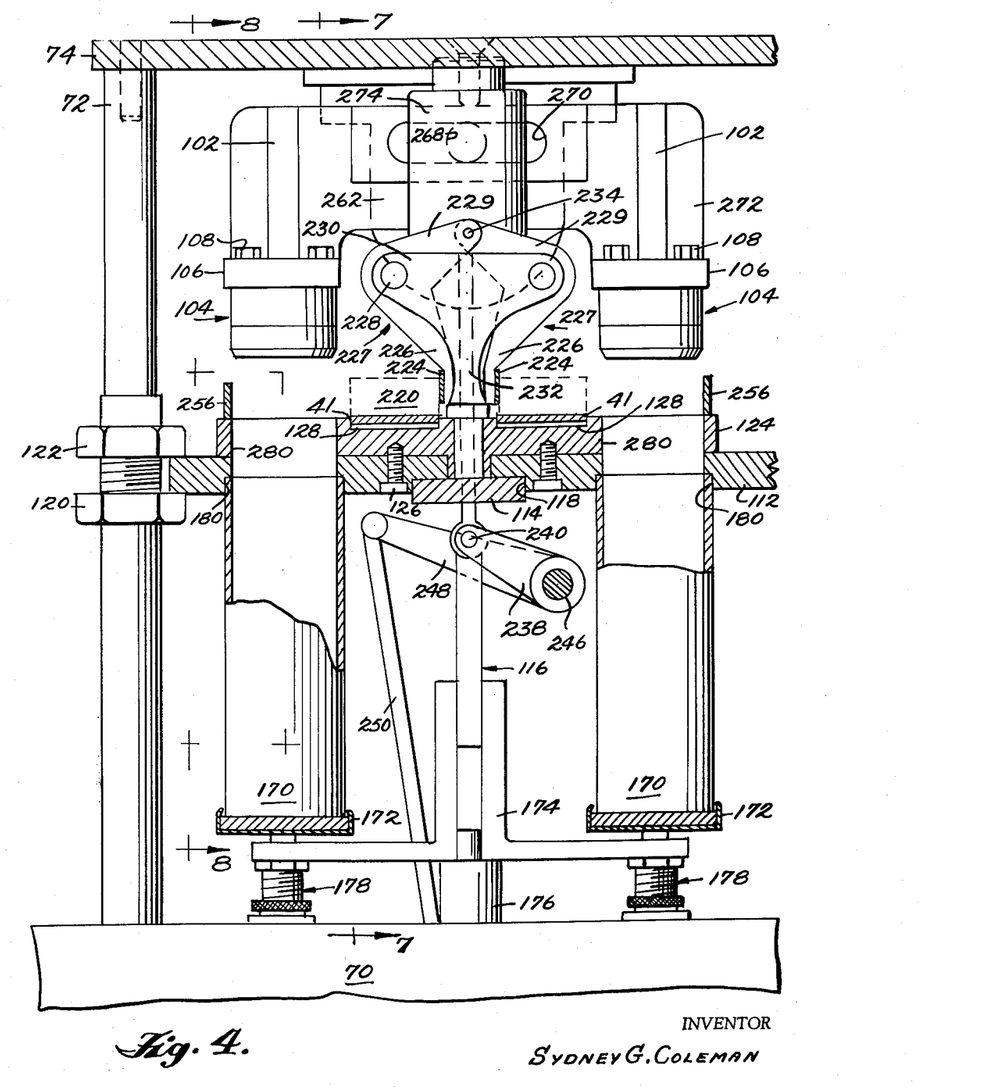
FIGURE 4 is an enlarged, fragmentary cross-sectional view taken along the line 4—4 of FIGURE 3, showing the plungers in their raised position and the dough strip transfer mechanism in a position prior to the transfer of the dough strips.
Figure 5:
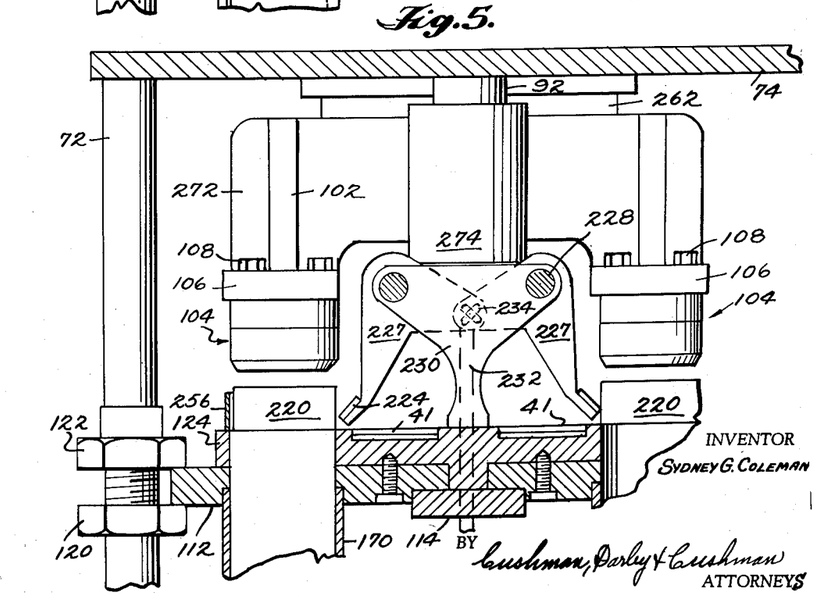
FIGURE 5 is a view similar to FIGURE 4 showing the dough strip transfer mechanism after the transfer of the dough strips.
Figure 6:
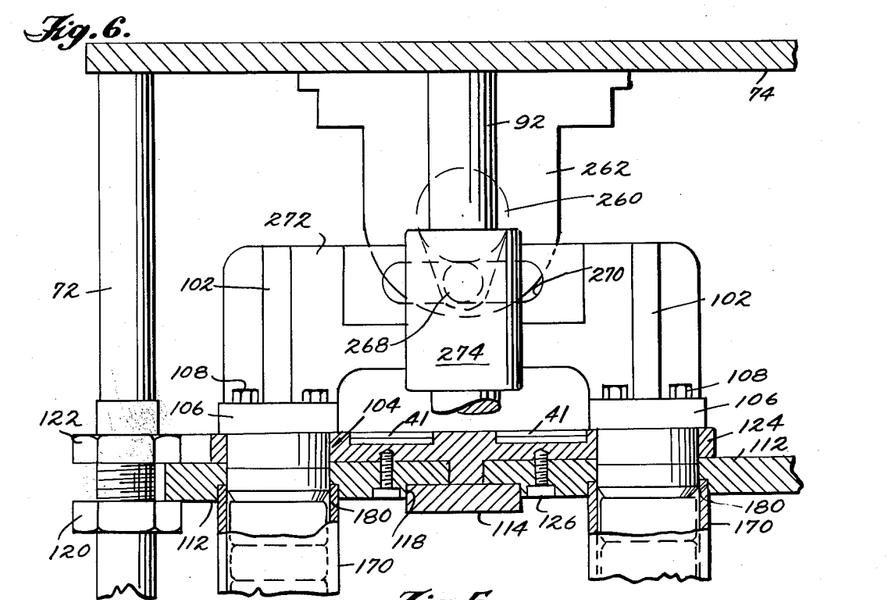
FIGURE 6 is a view similar to FIGURE 4 showing the plungers in their lowered position.
Figure 7:
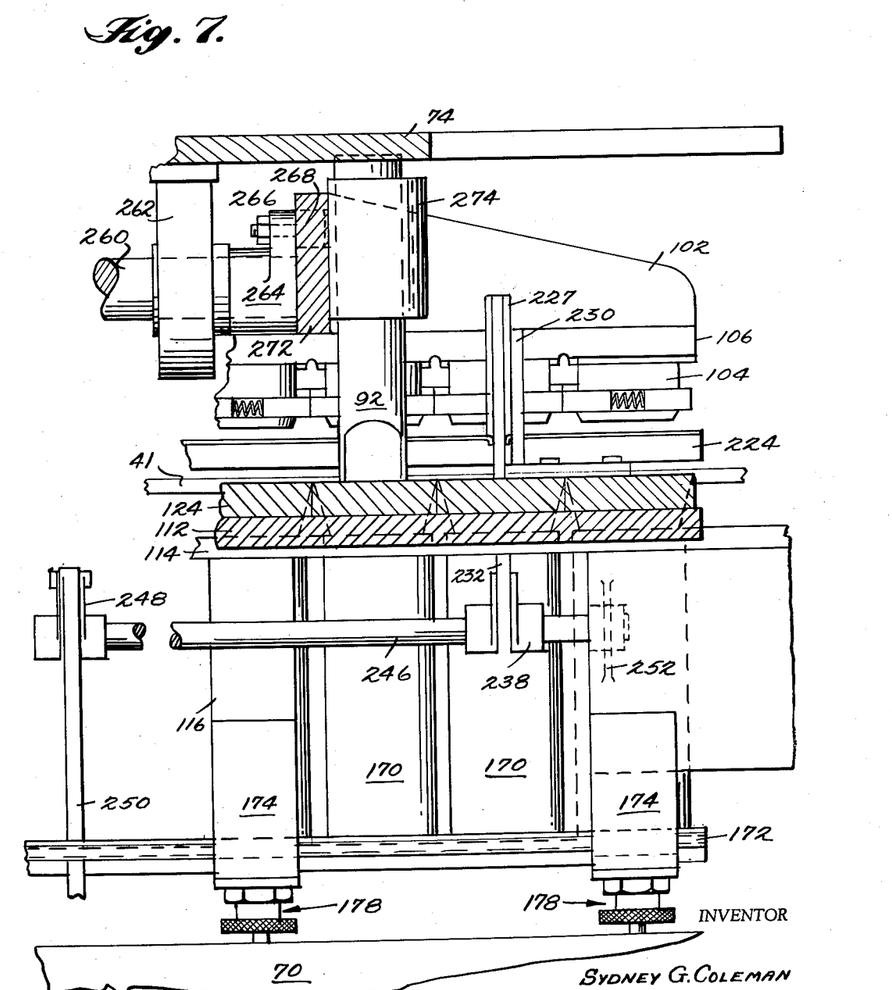
FIGURE 7 is a fragmentary cross-sectional view taken along the line 7—7 of FIGURE 4.

Mounted to the machine base cabinet 70 (FIGURE 2) and carried by vertical supports 72 is a motor support plate 74 to which a transmission unit 76 is secured in spaced relation to the conveyor drive motor 52. Mounted above the transmission unit and carried by a support 78 is a drive motor 80 which drives the transmission unit 76 through any suitable means such as a belt and pulley assembly 82. Transmission unit 76 includes an output drive shaft 86 which in turn is connected to reciprocate the plunger assembly 100, by any suitable means such as belt and pulley assembly 88 having a "Scotch yoke" 90 of well-known design connected thereto. Plunger assembly 100 is slidably mounted beneath the motor support plate 74 on vertical supports 92 extending downwardly therefrom and comprises a plunger carrier 102 from which downwardly extend a two-spaced series of longitudinal aligned resilient-head, dough blank forming plungers, generally indicated at 104. As shown in FIGURE 4, the plungers 104 of each series are secured as by threaded studs 108 to a longitudinally extending horizontal flange 106 formed on the plunger carrier 102.

The die plate assembly 110 is located beneath the plunger assembly 100 and comprises a pair of parallel die carrier plates 112, supported on their inner edges by a longitudinally extending horizontal support 114 carried by four centrally located vertical supports 116 resiliently mounted in spaced relation on the base cabinet.

The die carrier plates 112 are notched, as at 118, so as to be securely held by the horizontal support 114 with the outer edges of the die carrier plates supported by lower nuts 120 carried by the vertical support 72. By adjusting the lower nuts 120, the die carrier plate may be accurately placed in any desired horizontal position and fastened securely by tightening cooperating upper nuts 122 threaded on the supports 72. Secured to the upper surface of each die carrier plate as by threaded studs 126 is a series of individual dough blank forming dies 124. The upper surface of the dough blank forming dies is provided with transversely spaced channels 128 through which the endless belts 41 pass.

The container conveying and indexing assembly 140 is mounted beneath the die plate assembly 110 and comprises parallel endless chains 142 trained about idler sprocket wheels 144 and drive sprocket wheels 146. The drive sprockets 146 are supported by vertical supports 148 which are secured to the base cabinet 70 and the idler sprockets are supported by vertical supports 150 also secured to the base cabinet 70. Adjusting means 152 are provided on each of the supports 150 in order to maintain the endless chains 142 in the desired position. Each of the endless chains 142 is provided with a plurality of uniformly spaced container moving fingers 154 which extend horizontally outwardly from the associate chain.

Intermittent rotary motion is imparted to the drive sprockets 146 by any suitable means such as an air cylinder 160 located in base cabinet 70 which also houses a compressed air reservoir tank 162 from which air under pressure is delivered to the air cylinder 160. Upon actuation of the air cylinder 160, lever 164 is moved toward a ratchet type indexing clutch 166 thus rotating an arm 168 of the clutch 164 in a direction toward the right as viewed in FIGURE 1. Upon retraction of the piston (not shown) of air cylinder 160, lever 164 returns to its original position causing arm 168 to move in the opposite direction which, through the action of the indexing clutch 166, causes drive sprockets 142 to rotate in a direction moving the endless chains 142 forward one step.

The containers 170 which are moved by the container conveying assembly 140 are supported by a pair of parallel horizontally extending channels 172, as shown in FIGURE 4. Each channel 172 is supported by a plurality of longitudinally spaced L-shaped brackets 174 forming part of the vertical supports 116. Each pair of associated brackets 174 are spaced apart transversely to slidably receive the reduced upper end of a guide member 176 which is secured to the base cabinet 70. A shock absorber 178 is threadedly mounted on each bracket 174 and has its upper end in engagement with the lower surface of the associated channel 172 to thereby determine the vertical position thereof so that the top of containers 170 will be positioned to ride in an associated horizontal channel 180 formed in the underside of the die carrier plate 112. The shock absorbers 178 are provided internally with springs (not shown) and the lower ends thereof engage the upper surface of the base cabinet and serve to resiliently yield during the operation of the plunger assembly 100, if necessary. Containers are fed into the container conveying assembly by any suitable device (not shown) at a position near idler sprocket 144 and are removed from the other end of the machine by conveyors (not shown) or by hand.

In normal operation of the machine, ribbons of dough 38 coming from a forming machine (not shown) are fed to the conveying means 40 at the left of the machine, as viewed in FIGURE 1. The ribbons are then moved by the conveyor to the position shown in FIGURE 1 at which time air cylinder 66 is actuated to cause the dough strip notching assembly to move downwardly. As mentioned previously, this assembly includes a cutter carrier 62 from which downwardly extend a plurality of dough strip notching cutters 68.

Figure 9:
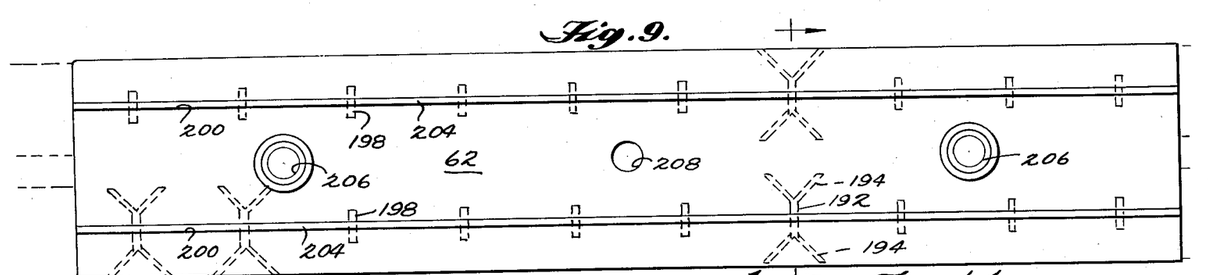
FIGURE 9 is a detailed top plan view of the dough strip notching assembly of the present machine.
Figure 10:
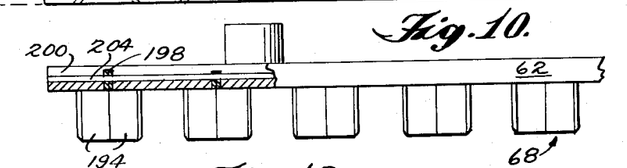
FIGURE 10 is a side elevation view of the dough strip notching assembly, partially in section.
Figure 13:
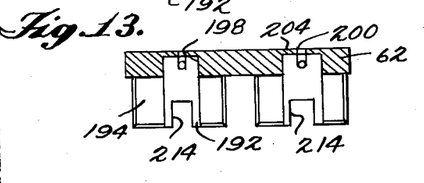
FIGURE 13 is a cross-sectional view taken along the line 13—13 of FIGURE 9.
Figure 14:
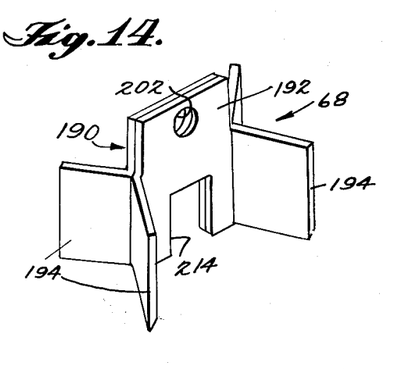
FIGURE 14 is a perspective view of one of the dough strip notch cutters.

Details of the assembly may be best understood by referring to FIGURES 9–14. As shown in FIGURE 14, the individual cutters 68 are formed of two metal plates 190 having contiguous integrally secured central portions 192 and opposite end portions 194 diverging outwardly from opposite sides thereof. The lower edges of the plates are sharpened in order to cut out a notch 196 (FIG. 11) from the dough ribbon 38. The individual cutters are secured to cutter carrier 62 by inserting the upper end of central portion 192 into two series of sockets 198 formed in the lower surface of the cutter carrier 62 in equally spaced longitudinal relation as shown in FIGURE 9. A pair of parallel longitudinal grooves 200 formed in the upper surface throughout the entire length of cutter carrier 62 intersect the sockets 198. Formed in the upper end of the central portions 192 of each cutter 68 is an aperture 202 for receiving a rod 204 which passes through the apertures 202 in the associate groove 200 so that the cutters may be held in the cutter carrier with top of the end portions 194 resting against the underside of cutter carrier 62. Cutter carrier 62 is provided with a pair of longitudinally spaced apertures 206 on its center line to receive the vertical guide supports 64 and is centrally apertured, as at 208, on its center line to receive the actuator rod 58 (FIG. 1) of air cylinder 66.

Figure 11:
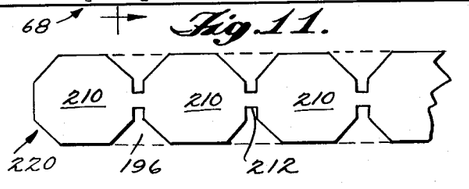
FIGURE 11 is a top plan view of a dough strip formed by the notching assembly.
Figure 12:
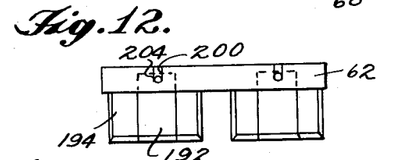
FIGURE 12 is an end elevation view of the dough strip notching assembly.

As the entire assembly moves downwardly the cutters penetrate the edges of the dough ribbon 38 and cut the notches 196 therefrom thus forming a plurality of integrally joined blanks 210. The blanks are integrally joined at 212 in view of the fact that all the cutters 68 except those secured on the extremities of the cutter carrier 62 have a cut-out 214 removed from the lower edge of the central portion 192, as shown in FIGURES 13 and 14. The end cutters (FIG. 12) completely sever the ribbons of dough 38 so as to form the desired strips 200 of integrally joined blanks 210 as shown in FIGURES 3 and 11.

While the dough strip notching assembly is in the down position, suitable means (not shown) preferably compressed air, is employed to remove the cut-out portions from the dough strip. These portions are collected and returned to the dough ribbon forming machine by any suitable means (not shown). As the dough strip notching assembly 60 moves upwardly, the dough strips 220 are moved by conveying means 40 to the position shown in FIGURE 3 and another portion of the dough ribbons 38 moves in to take place under the notching assembly.

Figure 22:
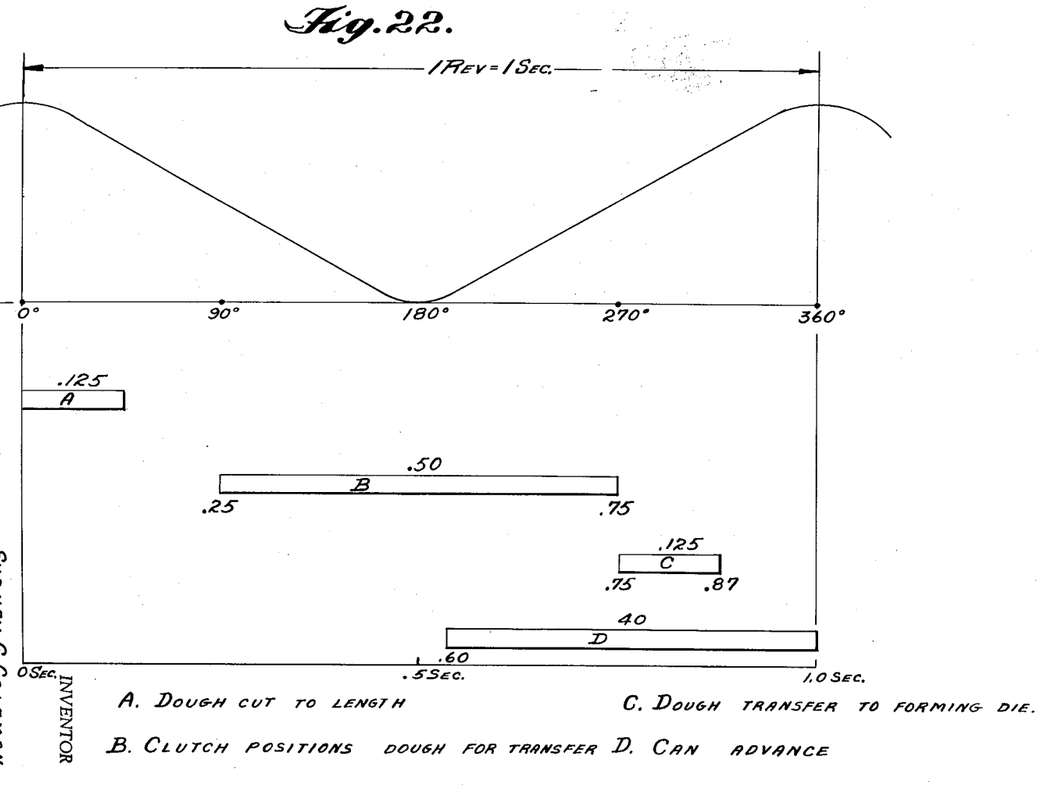
FIGURE 22 is a flow diagram of the sequence of operations of various elements of the machine.

As shown in FIGURE 22, as the conveyors 40 carry the notched dough strips 220 forward, the plunger assembly 100 moves downwardly to form and package individual blanks of dough from the strips of dough already in position on the die plates in a manner described below. As the plunger assembly 100 ascends, the container conveying assembly 140 is activated in a conventional manner to index each one of the series of containers 170 forward through the action of the air cylinder 160, lever 164, and ratchet type indexing clutch 166, as previously described.

During the motion of the container conveying assembly 140, the dough strips 220 are moved laterally by the dough strip transfer assembly 222 shown in FIGURES 3–7. The dough strip transfer assembly comprises a pair of parallel pusher bars 224 which extend longitudinally and centrally along the inside edge of the endless belts 41. The pusher bars are slightly longer than and parallel to the vertical edges of the dough strips 220 as they rest on the conveyor belts 41. Each bar has an inner surface fixed at each end to the lower end of a downwardly extending crank arm 226 of a bell crank lever 227, pivotally mounted, as at 228, to vertical brackets 230 fastened to the upper surface of the associate dies. Each bell crank lever 227 includes an upwardly and inwardly extending crank arm 229 having an elongated slot formed in the outer end thereof. A pin 234 extends through both slots in arms 229 and is fixed to the upper end of a rod 232, the lower end of which is pivotally connected to the outer end of a crank arm 238 fixed to a shaft 246 suitably journalled on the base cabinet, as by vertical end supports 252. It is to be understood that a similar assembly is to be found on each end of the machine each of which is secured to the rod 246 in the manner described above. The shaft 246 has fixed thereto an intermediate crank arm 248, the outer end of which is pivotally connected to the upper end of an actuator rod 250 of an air cylinder 252 (FIG. 1).

In operation then, as the plunger assembly 100 ascends a suitable timing device (not shown) causes air cylinder 252 to become actuated which in turn causes actuator rod 250 to be moved downwardly thus turning the horizontal shaft 246 by action of crank arm 248 causing crank arms 238 to pull the rods 232 downwardly so as to pivot crank arms 226 about the pivot 228 so that the pusher bars 224 secured to the lower ends thereof move outwardly so as to push the dough strips 220 from the conveyor belts 41 (FIG. 5) onto the die plates 124. To prevent the dough strips from moving too far laterally, guard bars 256 are preferably placed longitudinally along the outer edge of the die plates 124 (FIG. 4). The air cylinder 252 then reverses and the crank arms are moved back to their original position (FIG. 4) as the rod 250 is moved upwardly.

The machine has now completed one full cycle of operation and the plunger assembly starts downwardly again through the action of continuously operating motor 80 and transmission unit 76. The drive belt 88 driven by the shaft 86 of the transmission unit causes a shaft 260 of the "Scotch yoke" 90 to rotate within suitable bearing supports 262 which extend downwardly from the motor support plate 74 on either side of drive belt 88. Carried on each end of the shaft 260 and secured thereto are crank arms 264 to the outer ends of which are secured, as by studs 266, rollers 268 which fit into horizontal grooveways 270 in transverse ribs 272 formed on the plunger carrier 102. Rigidly secured to the ribs 272, as by welding or the like, are the sleeves 274 which are slidably mounted on vertical supports 92 so that as the shaft 260 rotates, crank arms 264 rotate from the position shown in FIGURE 7 to the position shown in FIGURE 8, through the action of the rollers 268 in grooveways 270, causing the sleeves 274 to move downwardly thus moving the attached plunger assembly 100 downwardly also.

Figure 15:
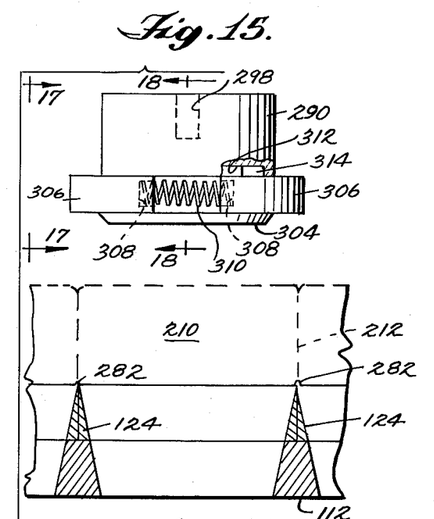
FIGURE 15 is a fragmentary side elevational view of the plunger and die assembly showing one of the dough blank forming plungers thereof in elevation and the co-operating die forming aperture in vertical section, the plunger being shown in a raised position with respect to the die.
Figures 16, 19, 20, 21:
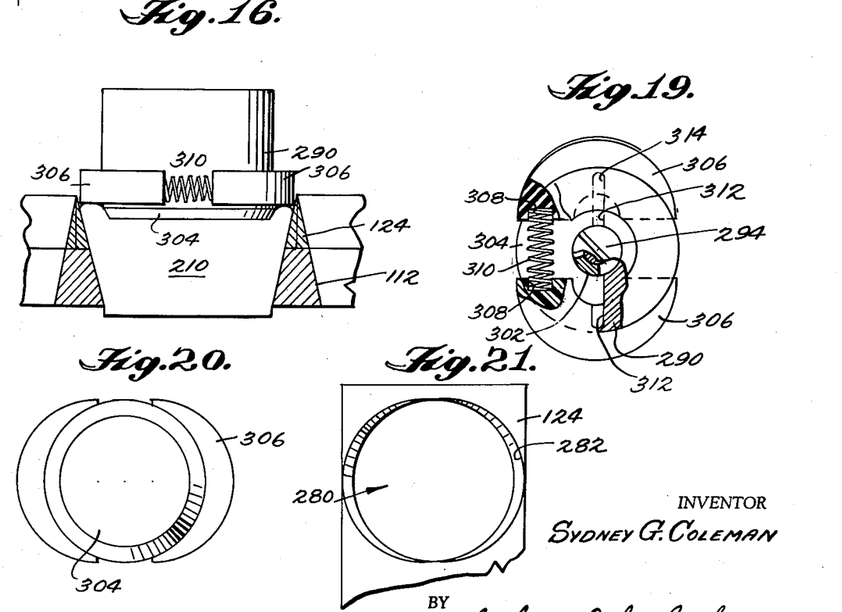
FIGURE 16 is a view similar to FIGURE 15 showing the plunger in an intermediate position with respect to the die.
FIGURE 19 is a top plan view partially in section of one of the dough forming plungers.
FIGURE 20 is a bottom plan view of one of the dough forming plungers.
FIGURE 21 is a fragmentary, top plan view of one of the die plates and blank forming apertures.
Figure 17:
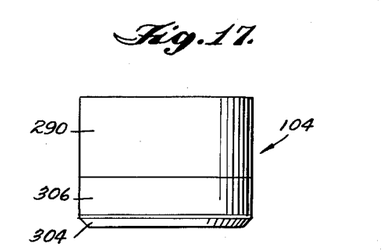
FIGURE 17 is an elevational view taken along the line 17—17 of FIGURE 15.

Referring now to FIGURES 15–21, each of the individual plungers 104 comprises a plunger head carrier 290 cylindrical in shape and centrally bored as at 292, to receive a threaded stud 294. The upper surface of carrier 290 has a counterbore 296 formed therein, as shown in FIGURE 18, and is provided with diametrically located threaded sockets 298 spaced slightly inwardly from the periphery thereof to receive the studs 108 (FIG. 4) which hold the carrier to the horizontal flange 106 of the plunger carrier 102. The underside of the plunger head carrier 290 has a counterbore 300 formed therein, as shown in FIGURE 18, in order to receive a plunger stem 302 extending upwardly from and integral with the central portion of a disc 304. Interposed between the disc 304 and the underside of the plunger carrier are two semicircular disc elements 306 adapted for transverse linear sliding movement with respect to the plunger stem 302. The semicircular discs are provided with opposed pairs of horizontal apertures 308 disposed on opposite sides of the plunger stem 302, each opposed pair receiving a spring 310 which serves to bias the disc elements outwardly with respect to the stem 302. The underside of the plunger head carrier has a diametric groove 312 formed therein, as shown in FIGURE 19, to receive bosses 314 extending upwardly from the semicircular disc elements 306 to guide the same during their movement and to limit their outward movement. The entire assembly is held together, as shown in FIGURE 18, by the threaded stud 294 which extends downwardly through the bore 292 of plunger head carrier 290 into a threaded socket 316 formed in the upper end of the plunger stem 302.

As shown in FIGURES 15, 16 and 21, the die plate assembly includes a blank forming aperture 280 for receiving each of the plungers of the plunger assembly. Each aperture is elliptical in cross-sectional configuration in the side of the forming dies 124 onto which the dough strip 220 is transferred (FIG. 6) and uniformly change in cross-sectional configuration so as to define a circle with a diameter the same as the minor axis of the ellipse in the undersurface of the die carrier plate 112. The die plates 124 are secured to the die carrier plates 112 in the manner previously described so that the major axis of the ellipse of each blank forming aperture 280 is parallel to the longitudinal center line of the machine and the conveyor belts 41. The individual plungers 104 are secured to the plunger carrier 102 in the manner described previously so that the longitudinal groove 312 in the underside of the plunger head carriers 290 is parallel to the major axis of the ellipse of blank forming apertures 280 and the plungers 104 are aligned with the apertures 280, as shown in FIGURES 15 and 16.

As the plunger assembly 100 moves downwardly each of the individual plungers 104 carried thereby forces one of the integrally joined blanks 210 of dough strip through one of the blank forming apertures 280 in the following manner: Disc 304 and the exposed portions of the semicircular disc elements 306 exert pressure substantially throughout the entire upper surface of the integrally joined blanks 210 forcing the blanks downwardly through the apertures 280. As the blanks are forced downwardly the joined portions 212 are forced over a knife edge 282, defining the ellipse, severing the joined blanks to form a plurality of individual blanks substantially octagonal in configuration (FIG. 11). As the plungers 104 continue to descend, sides 284 of the blank forming apertures, which uniformly converge to define a circular aperture, force the semicircular disc elements 306 inwardly toward plunger stem 302 against the action of springs 308. When the plungers 104 have passed downwardly through the apertures 280 to the positions shown in FIGURE 8, the octagonal blank of dough 210 has been changed into a circular blank of dough with a diameter the same as the diameter of the circle defined in the lower surface of the die plate 124.

By the method above described, it is shown that a particular advantage has been disclosed in the art of forming and packaging dough biscuits. No excess dough remains after the forming and packaging of the individual dough blanks because the original integrally joined blanks are transformed into circular dough blanks by means of the resilient plungers and novel die structure herein provided. The absence of any excess dough after the final forming operation is a distinct advantage in that no further operation need be performed by the machine operator.

Figure 8:
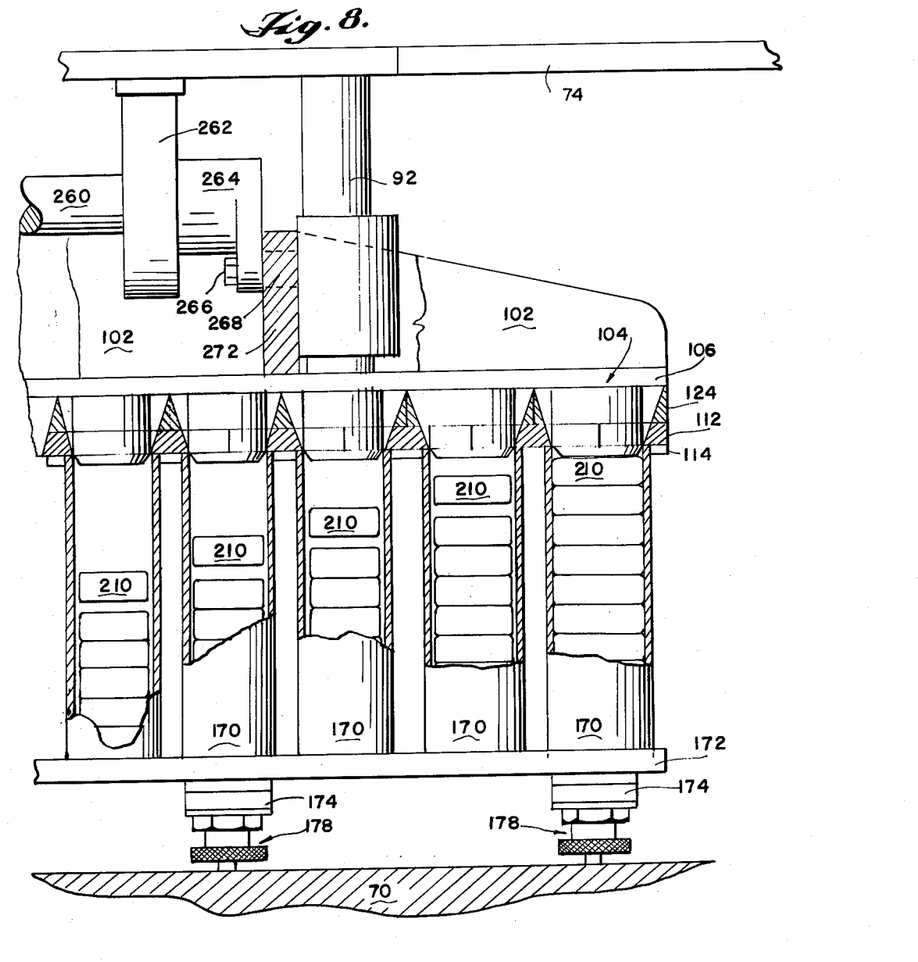
FIGURE 8 is a fragmentary cross-sectional view taken along line 8—8 of FIGURE 4.

When the dough blanks 210 have been forced completely through the blank forming apertures 280 they fall by gravity into the containers 170, of slightly larger diameter than the diameter of the formed blanks, arranged under the blank forming apertures as shown in FIGURE 8.

The plunger assembly 100 now begins to ascend as the shaft 260 of the "Scotch yoke" 90 continues to rotate and the container conveying and indexing assembly 140 is actuated as described above so as to index the containers forward under the next successive blank forming aperture. As shown in FIGURE 8, with each following complete cycle of operation of the machine, each container 170 receives a formed dough blank 210 from the next successive blank forming aperture so that the container under the first of said apertures contains one blank and each successive container contains an additional blank with the container under the last of the apertures containing ten blanks. With each complete cycle of operation, a full container is removed from under the last of the blank forming apertures 280 and an empty container is moved into position under the first of the blank forming apertures.

Thus it will be seen that there has been provided by the invention a machine for automatically forming and packaging blanks of dough wherein the dough handling has been reduced to minimum. After the initial dough strip forming operation the dough strip and the integral blanks therein are not subject to any handling other than that necessary to package the individual dough blanks. All of the dough which is subjected to the forming and packaging operations of the machine is eventually packaged. This is true no matter what the shape of the dough strip may be, because of the novel plunger and die assembly disclosed herein. Due to the particular features of the plunger and die assembly, any shape of dough is changed into the desired final shape to be packaged without any excess dough remaining which must be reworked or disposed of by other means.

It will be further seen that there has been provided by this invention a machine in which the various objects hereinbefore set forth, together with many practical advantages, are successfully achieved. As various possible embodiments may be made of the mechanical features of this invention, all without departing from the scope thereof, it is to be understood that all matter hereinbefore set forth or shown in the accompanying drawings is to be interpreted as illustrative, and not in a limiting sense.

I claim:

1. A machine for forming and packaging blanks of dough comprising a conveyor for carrying a strip of dough, a die plate adjacent said conveyor, said die plate having a series of longitudinally spaced blank forming apertures extending vertically therethrough, means adjacent said die plate for transferring the strip of dough laterally from said conveyor means outwardly onto said die plate, a series of longitudinally spaced plungers mounted above said die plate and aligned with said blank forming apertures for vertical movement through said blank forming apertures so as to force said dough strip through said die plate to form a plurality of blanks, means for supporting a plurality of containers beneath said die plate in a position to receive the blanks of dough forced through the apertures thereof and means for moving said containers beneath said die plate in relation to successive vertical movements of said plungers whereby each container receives successive blanks from successive apertures.

2. A machine as defined in claim 1 wherein each of said blank forming apertures is substantially elliptical in cross section at the upper surface of said die plate and circular in cross section at the lower surface of said die plate so as to alter the shape of the dough blanks as they are forced through said apertures by said plungers.

3. A machine for forming and packaging blanks of dough into containers as defined in claim 1 wherein each of said plungers is of the same length and includes a resilient head portion, and wherein each of said blank forming apertures is shaped on the upper surface of said die plate to define a knife edge to sever individual blanks from the dough strip, each of said die plate apertures having a cross section area on said surface different from and larger than the cross section area of said aperture on the lower surface of said die plate so that as the plungers force the individual blanks through said dies the resilient plunger heads adapt themselves to the die in a manner so as to alter the shape of said dough blanks as they are forced through said dies by said plungers.

4. A machine for forming and packaging blanks of dough comprising a conveyor for carrying a strip of dough, means at one end of said conveyor for notching said strip of dough to form a plurality of integral blanks therein, means for driving said conveyor means intermittently, a die plate spaced laterally apart and parallel to the other end of said conveyor, means at said latter end of said conveyor to transfer said dough strip laterally onto said die plate, a plurality of forming apertures spaced longitudinally in said die plate and located beneath each of said integral blanks of said dough strip when said dough strip is moved onto said plate, a plunger assembly mounted adjacent said die plate, a plurality of plungers on said plunger assembly above said die plate so that one of said plungers is above each of said blank forming apertures, means to reciprocate said plunger assembly so that on a downward movement of said plunger assembly each of said plungers severs a blank from said dough strip and forces said severed blanks through said forming apertures in said die plate, a support beneath said die plate, a plurality of containers on said support to receive said formed blanks, and means to move said containers incrementally on said support in relation to the movement of said plunger assembly so that upon each upward movement of said plunger assembly an empty container is moved under the first of said forming apertures and a full container is moved from under the last of said forming apertures.

5. A machine for forming and packaging blanks of dough comprising means for forming a strip of dough, said forming means adapted to notch said strip of dough to form a plurality of integral blanks therein, means to convey said formed strip, a die plate mounted on one side of said conveyor means and outwardly parallel thereto, means to transfer said formed dough strips laterally onto said die plate, said die plate having a plurality of apertures arranged longitudinally therein, a plunger assembly mounted above said die plate for vertical movement, a support for a plurality of containers extending beneath said die plate to receive the formed blanks from said die plate, and means to move the containers in relation to the movement of the plunger assembly incrementally and longitudinally beneath said die plate.

6. A machine for forming and packaging blanks of dough into containers, an endless belt conveyor for conveying a strip of dough, a die plate mounted outwardly adjacent said conveyor means, means for transferring the strip of dough laterally onto said die plate, said die plate having a plurality of openings arranged therein, a plunger assembly cooperating with said die plate for forming a plurality of blanks of dough, means to support containers in a position to receive the formed blanks of dough, and means to move the containers relative to the movement of said plunger assembly.

7. A machine for forming and packaging blanks of dough in containers, means for conveying a strip of dough longitudinally on its longitudinal axis, a die plate at one end of said conveyor means and laterally parallel thereto, means to transfer said strip of dough laterally from said conveyor means onto said die plate, said die plate having a plurality of blank forming apertures arranged longitudinally therein, a plunger assembly cooperating with said die plate for forming blanks of dough, means to support containers underneath said blank forming apertures in a position to receive the formed blanks of dough, and means to move said containers relative to the movement of said plunger assembly.

8. A machine for forming and packaging blanks of dough in containers, a plunger and die assembly for forming said blanks comprising a die plate having a plurality of blank forming apertures therein, each of said apertures varying in cross sectional configuration from one end thereof to the opposite end thereof, a plunger mounted for movement through each of said apertures to force dough therethrough to thereby form a blank of dough, each of said plungers having head means including a plurality of elements movable laterally with respect to each other in response to the movement of the plunger through said aperture, said elements providing dough engaging surface means substantially filling said aperture at all times during the movement of the plunger therethrough.

9. A machine as defined in claim 8 wherein said blank forming apertures are larger in cross sectional configuration in one end thereof and uniformly decrease in cross sectional configuration to the opposite end thereof.

10. A machine as defined in claim 8 wherein said blank forming apertures are substantially elliptical in cross sectional configuration in one end thereof and uniformly change in cross sectional configuration to the opposite end thereof so as to define a circle.

11. A machine as defined in claim 8 wherein said plunger elements are spring pressed outwardly from the stem of said plunger and are adapted to be biased inwardly toward said plunger stem.

12. A machine as defined in claim 8 wherein said plungers comprise a plunger head carrier, a resilient plunger head comprising a disc element and plunger stem for securing said disc to said plunger head carrier, two substantially semicircular disc elements interposed between said disc element and plunger head carrier, said semicircular disc elements being spring pressed apart and adapted for lateral movement with respect to said disc.

13. A machine as defined in claim 8 wherein said blank forming apertures are substantially elliptical in cross sectional configuration in one end thereof and uniformly change in cross sectional configuration so as to define a circle, and wherein said plungers comprise a plunger head carrier, a resilient plunger head comprising a stationary disc element and plunger stem for securing said disc to said plunger head carrier, two substantially semicircular disc elements interposed between said disc and said plunger head carrier, said semicircular disc elements being spring pressed apart and adapted for lateral movement with respect to said disc in response to the change in configuration of each blank forming aperture as each plunger passes therethrough.

References Cited in the file of this patent

UNITED STATES PATENTS

| | | |
|---|---|---|
| 2,623,480 | Stiles | Dec. 30, 1952 |
| 2,664,833 | Armstrong et al. | Jan. 5, 1954 |
| 2,707,922 | Ferguson et al. | May 10, 1955 |
| 2,734,465 | Head | Feb. 14, 1956 |
| 2,790,399 | Mayer | Apr. 30, 1957 |
| 2,941,341 | Clinton | June 21, 1960 |